(12) United States Patent
Suryawanshi et al.

(10) Patent No.: US 11,188,463 B2
(45) Date of Patent: Nov. 30, 2021

(54) REDUCED DOWNTIME FOR A VIRTUAL MACHINE CONTENT-BASED READ CACHE

(71) Applicant: VMWARE, INC., Palo Alto, CA (US)

(72) Inventors: Vikas Suryawanshi, Bangalore (IN); Zubraj Singha, Bangalore (IN)

(73) Assignee: VMware, Inc., Palo Alto, CA (US)

(*) Notice: Subject to any disclaimer, the term of this patent is extended or adjusted under 35 U.S.C. 154(b) by 96 days.

(21) Appl. No.: 16/561,040

(22) Filed: Sep. 5, 2019

(65) Prior Publication Data

US 2021/0019259 A1 Jan. 21, 2021

(30) Foreign Application Priority Data

Jul. 19, 2019 (IN) .............................. 201941029254

(51) Int. Cl.
*G06F 12/0806* (2016.01)
*G06F 9/455* (2018.01)
*G06F 12/0895* (2016.01)
*G06F 9/451* (2018.01)
*G06F 9/50* (2006.01)

(52) U.S. Cl.
CPC ...... *G06F 12/0806* (2013.01); *G06F 9/45558* (2013.01); *G06F 12/0895* (2013.01); *G06F 2009/45583* (2013.01); *G06F 2212/1041* (2013.01)

(58) Field of Classification Search
None
See application file for complete search history.

(56) References Cited

U.S. PATENT DOCUMENTS

2018/0314542 A1* 11/2018 Karkun ................. G06F 16/188

* cited by examiner

*Primary Examiner* — Michael Alsip (57) ABSTRACT

A system is described for enabling content-based read caching on a virtual machine without downtime for creating the digest file by launching the virtual machine before the digest file is produced and creating the digest file dynamically during runtime. After the virtual machine is executed, a background process creates the digest file in the background. The background process is paused during input/output operations and resumes when there are no pending input/output requests.

20 Claims, 5 Drawing Sheets

REDUCED DOWNTIME FOR A VIRTUAL MACHINE CONTENT-BASED READ CACHE

RELATED APPLICATIONS

Benefit is claimed under 35 U.S.C. 119(a)-(d) to Foreign Application Serial No. 201941029254 filed in India entitled "REDUCED DOWNTIME FOR A VIRTUAL MACHINE CONTENT-BASED READ CACHE", on Jul. 19, 2019, by VMWare, Inc., which is herein incorporated in its entirety by reference for all purposes.

TECHNICAL FIELD

The present disclosure generally relates to virtual machines and virtual desktop infrastructure, and more specifically to techniques for efficient caching of data in virtual machines.

BACKGROUND

Virtual desktops provided as part of a virtual desktop infrastructure (VDI) or desktop-as-a-service (DAAS) offerings are becoming more commonplace in today's enterprise work environments. The security of having a remotely stored desktop, ability to access the desktop from any location and on any device, centralized desktop management, efficient use of hardware resources, as well as numerous other benefits made possible by VDI/DAAS are a large benefit for many organizations.

In a conventional VDI or DAAS environment, each user in an enterprise is provisioned a virtual desktop and is given access to their virtual desktop over a remote network connection, such as a WAN connection. The virtual desktops are typically hosted on servers that reside in a data center of the enterprise (or a third-party service provider), and each host server may execute multiple virtual desktops. Users can utilize a client device to remotely log into their individual virtual desktop and all of the application execution takes place on the remote host server, which is linked to the local client device over a network using a remote display protocol, such as remote desktop protocol (RDP), PC-over-IP protocol (PCoIP), virtual network computing (VNC) protocol, or the like. Using the remote desktop protocol, the user can interact with applications of the virtual desktop, which are running on the remote host server, with only the display, keyboard, and mouse information communicated with the local client device. A common implementation of this approach is to host multiple desktop operating system instances on separate virtual machines deployed on a server hardware platform running a hypervisor.

However, VDI deployments, particularly at large scale, still pose numerous challenges. For example, because a central storage subsystem in VDI services large numbers of endpoints, when numerous endpoints simultaneously produce extensive I/O (input/output) requests on the storage subsystem, a performance bottleneck can result as the system fails to service the requests in a timely manner. This can occur, for example, during a boot storm. One approach for improving performance in such situations is by implementing content-based read cache (CBRC) in virtual machines. However, implementation of CBRC requires generating a digest file for the entire virtual disk of a VM, which is a cryptographical representation of the virtual disk and stores metadata about the various blocks on the virtual disk. Conventionally, the digest file needs to be created before the VM is launched and the creation of the digest file is a lengthy offline process in current systems, making this technology inefficient and impractical in many applications.

A more efficient approach is desirable for managing data caching in virtual machines.

DETAILED DESCRIPTION

Systems and methods in accordance with various embodiments of the present disclosure overcome at least some of the above-mentioned shortcomings and deficiencies by providing more efficient ways to cache data in virtual machines. In particular, embodiments described herein provide ways to implement content-based caching in VMs without the downtime required for producing the digest file by launching the VM before the digest file is complete and utilizing background processes that create the digest file for the virtual disk while the VM is running.

The digest file is a key component of CBRC systems. This file is a representation of a VM's virtual disk (e.g., Virtual Machine Disk (VMDK), virtual hard disk (VHD), etc.) that contains a unique "key" or signature for blocks of the virtual disk. To create the digest file, the virtual disk is divided into blocks, such as atomic blocks of 4096 bytes or "4K" word size blocks. For each such block, a corresponding unique signature or key is generated, for example by using a cryptographic hashing algorithm such as the SHA-1 algorithm, and the key is stored in the digest file. The digest file maintains a mapping of each block of data in the virtual disk to a corresponding key, such that whenever a block of data from the virtual disk is requested, the digest file can be used to retrieve a corresponding key for the requested data.

When the VM requests a read from the virtual disk, in order to determine whether the requested data is available in the CBRC cache, the key for the requested data is retrieved from the digest file and compared with keys of data stored in the cache. The system generates and maintains keys for data available in the cache using the same key-generating algorithm as in the digest file for this purpose. The key retrieved from the digest file is compared to keys of the data in the cache to determine whether the cache contains the requested data. If a matching key is found, then the data corresponding to the key is retrieved from the cache. If a matching key is not found, then the data is retrieved from the virtual disk.

With present technology, in order for CBRC to be enabled for virtual machines, the digest file has to be created while the VM is in the powered off state. However, the process of generating the digest file, particularly for large virtual disks, can take a long time, since the time required to create the digest file is directly proportional to the size of the virtual disk file. Hence, a user wishing to access a VM on which CBRC is enabled may face significant downtime when launching the VM as a result of the time consumed building the digest file.

In various embodiments, the present invention reduces or eliminates the downtime when enabling CBRC on a VM by launching the VM before the digest file is produced and creating the digest file dynamically during runtime. The VM is powered on before the creation of the digest file starts, and the digest file is generated by a background process at VM runtime, while at the same time managing input/output operations received while the VM is running. In this architecture, after the VM is launched, a background process is initialized for creating the digest file by generating keys for blocks of data in the virtual disk. A data structure such as a bitmap is used to keep track of which portions of the virtual disk have been completed (i.e., for which blocks keys have been produced). For example, the virtual disk file can be partitioned into a number of sequential ranges, such that each sequential range is a sequence of multiple 4K blocks. The division of the virtual disk into sequential ranges addresses spatial locality considerations for the caching system. Each sequential range can contain the same number of blocks, and the size of each sequential range can vary, depending on the size of the virtual disk. In the bitmap, a corresponding bit can be assigned to represent each range of the virtual disk and to mark/track completion status of the range. Once a range has been completed in the digest file (i.e., keys for blocks in the range have been calculated and stored in the digest file), the bit corresponding to that range in the bitmap is set (i.e., set to "1") to mark or track that this range of the virtual disk has been completed.

After the VM is powered-on without downtime for creating the digest file, the background process can start creating a digest block for each sequential range, one at a time, which can be performed in a linear order starting from sequential range number one. In alternative embodiments, the order need not be sequential or performed in linear order and other methods of processing the ranges may be implemented. The digest block for each sequential range comprises the keys for the blocks in the sequential range, which are stored in the digest file. The background process thus processes the blocks to calculate keys in each sequential range to produce corresponding digest blocks in the digest file. Once the digest block for a sequential range is created, the bit for that sequential range is set in the bitmap and the thread moves on to the next sequential range for processing. When a VM I/O to the virtual disk is detected, the background process can be suspended while the I/O is serviced. When an I/O is serviced, the ranges involved in the I/O can be processed in the digest file and the corresponding bits can be set in the bitmap once the digest file is completed for those ranges. When there are no pending I/O requests, the background process can resume the process of building the digest file using the bitmap to determine which ranges of the virtual disk have not been completed in the digest table.

When a VM I/O request is received, the system checks if the requested data is already in the digest file (e.g., by checking the bitmap). If it is, then the system can proceed according to the regular CBRC framework. Ion various embodiments, for a read request, the system can check the digest file key against keys of data stored in the cache, and if there is a match then the data is retrieved from the cache, otherwise (if there is no match) the data is retrieved from the virtual disk. When a write request is received for blocks that are already completed in the digest file, the data can be written to the virtual disk and, because the corresponding existing keys in the digest file no longer represent the newly written blocks, the digest file can be marked to indicate that those keys are invalid. In an embodiment, new keys can be calculated for the blocks for which the write is received, and the digest file can be updated with the new keys (which may be performed after confirmation is received that the data has been written to the virtual disk).

If, however, a VM I/O request is received for virtual disk data that has not been completed in the digest file, a different process takes place. If the I/O is a read request, then the system will service the read without using the digest file (e.g., by retrieving the requested blocks from the virtual disk). After the read is serviced, keys are calculated for all blocks that lie in ranges on which the read lies. If the read request lies partially on a sequential range, keys for all blocks in the entire sequential range are calculated. Once the keys for all blocks in the ranges covering the read are calculated, the generated keys for the ranges are stored in the digest file and the corresponding bit in the bitmap is set to mark that the ranges have been completed in the digest file.

When a request to write data on ranges that have not been completed in the digest file is received, keys are calculated for the blocks for which the write is received in the in-memory data buffer and the blocks are then sent to the generic write data path to be written to the virtual disk. If the write request is aligned with sequential ranges, then the calculated keys of the blocks of the write data form complete digest blocks for the digest file. Once a notification of a successful write from the data path is received, the digest blocks in the digest file for each corresponding sequential range are updated with the calculated keys of the blocks for which the write is received, and the corresponding bits are set in the bitmap. If the write request is not aligned with the sequential ranges, then the keys for blocks other than the ones for which the write is received are also calculated. Once all the keys in the range are calculated and the digest blocks are updated in the digest file, the corresponding bits are set in the bitmap.

After I/O requests to the virtual disk are serviced, the background process determines what ranges of the virtual disk have not been completed based on the bitmap and resumes the process of hashing those ranges to complete the digest file. For example, the process can proceed linearly along the virtual disk to the next incomplete range, i.e., it can select the next unset bit in the bitmap and start creating the digest block for that range. Once the digest file is fully generated, the process is terminated.

Figure 1:
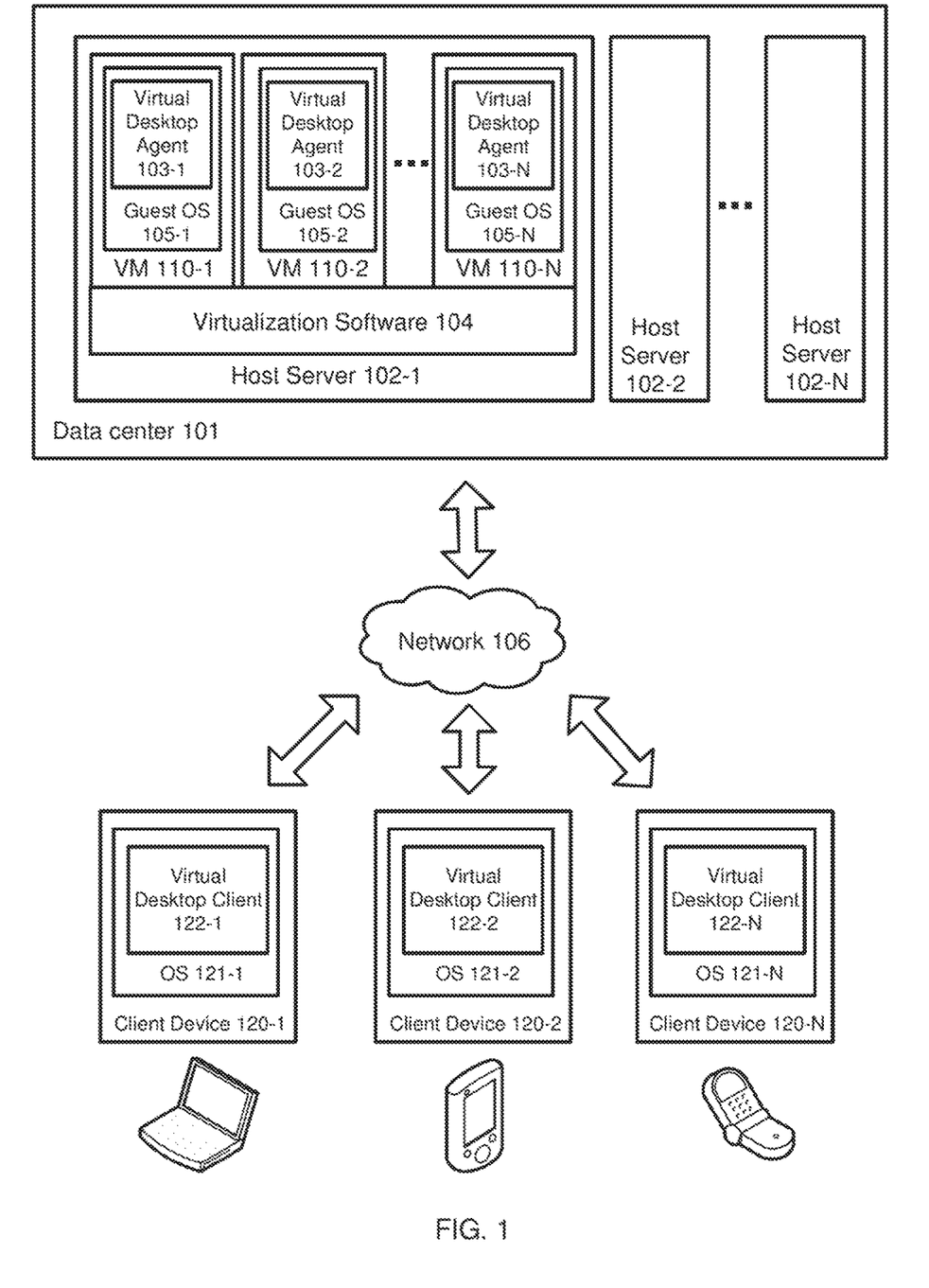
FIG. 1 illustrates an example of a virtual desktop environment, in accordance with various embodiments.

FIG. 1 illustrates an example of a virtual desktop environment, in accordance with various embodiments. The virtual desktop environment, such as VDI or DAAS environment, includes host servers (102-1, 102-2, 102-N) that are communicatively coupled with a number of client devices (120-1, 120-2, 120-N) via a network 106. Network 106 may be a wide area network (WAN), or other form of remote communication link between the host servers (102-1, 102-2, 102-N) and client devices (120-1, 120-2, 120-N). Network 106 may further include numerous other components, such as one or more firewalls, connection brokers, management servers, etc., which are not shown here so as not to obscure salient features of the remote desktop environment. Host servers (102-1, 102-2, 102-N) may physically reside in a data center 101 of the enterprise (e.g., in case of VDI) or in a data center of a third-party service provider (e.g., in case of DAAS).

By way of illustration, host server 102-1 can interoperate with client devices (120-1, 120-2, 120-N) to provide virtual desktop services to users of client devices (120-1, 120-2, 120-N). For example, host server 102-1 can host, for each user, a desktop that is presented by a guest operating system (such as one of the guest operating systems 105-1, 105-2, 105-N) running on a virtual machine (such as one of the virtual machines 110-1, 110-2, 110-N) on host server 102-1. In this context, the terms "desktop", "remote desktop", and "virtual desktop" refer to a computing environment in which a user can launch, interact with, and manage the user's applications, settings, and data. Each client device (120-1, 120-2, 120-N) can allow a user to view on a desktop graphical user interface (on a local display device) his/her desktop that is running remotely on host server 102-1, as well as provide commands for controlling the desktop. In this manner, the users of client devices (e.g., 120-1, 120-2, 120-N) can interact with the desktops hosted on host server 102-1 as if the desktops were executing locally on client devices (120-1, 120-2, 120-N).

In the embodiment of FIG. 1, host server 102-1 includes virtualization software 104 that supports the execution of one or more virtual machines (VMs) (e.g., 110-1, 110-2, 110-N). The virtualization software 104 may be a hypervisor, a virtual machine manager (VMM) or other software that allows multiple virtual machines to share the physical resources of the server. In the illustrated embodiment, each virtual machine (e.g., 110-1, 110-2, 110-N) can execute a guest operating system (e.g., 105-1, 105-2, 105-N) that hosts a desktop for a single user at a time. For example, if five users connect to host server 102-1 for the purpose of initiating remote desktop sessions, the host server 102-1 can launch five VMs, each hosting one desktop for each one of the five users. These types of virtual desktop environments where user desktops are hosted within separate, server-side virtual machines are often referred to as virtual desktop infrastructure (VDI) or Desktop-as-a-Service (DAAS) environments.

In such virtual desktop environments, each client device (e.g., 120-1, 120-2, 120-N) can execute a virtual desktop client (e.g., 122-1, 122-2, 122-N). For example, the virtual desktop client (e.g., 122-1, 122-2, 122-N) can be a stand-alone, designated client application ("native client"), or a web browser ("web client"). In some cases, a standard web browser may be modified with a plugin to operate as a web client. The interaction between the virtual desktop and the client device can be facilitated by such a virtual desktop client (e.g., 122-1, 122-2, 122-N) running in the OS (e.g., 121-1, 121-2, 121-N) on the client device (e.g., 120-1, 120-2, 120-N) which communicates with a server-side virtual desktop agent (e.g., 103-1, 103-2, 103-N) that is running on the guest OS inside the virtual machine (e.g., 110-1, 110-2, 110-N). In particular, the interaction can be performed by the virtual desktop agent transmitting encoded visual display information (e.g., framebuffer data) over the network to the virtual desktop client and the virtual desktop client in turn transmitting user input events (e.g., keyboard, mouse events) to the remote desktop agent.

It should be noted that the particular virtual desktop environment illustrated in FIG. 1 is shown purely for purposes of illustration and is not intended to be in any way inclusive or limiting to the embodiments that are described herein. For example, a typical enterprise VDI deployment would include many more host servers, which may be distributed over multiple data centers, which might include many other types of devices, such as switches, power supplies, cooling systems, environmental controls, and the like, which are not illustrated herein. Similarly, a single host server would typically host many more virtual machines than what is shown in this illustration. It will be apparent to one of ordinary skill in the art that the example shown in FIG. 1, as well as all other figures in this disclosure have been simplified for ease of understanding and are not intended to be exhaustive or limiting to the scope of the invention.

In such virtual desktop environments, particularly at large scale, problems can arise due to the sharing of resources by multiple VMs (e.g., 110-1, 110-2, 110-3). For example, because a central storage subsystem in VDI services large numbers of endpoints, when numerous endpoints simultaneously produce extensive I/O (input/output) requests on the storage subsystem, a performance bottleneck can result as the system fails to service the requests in a timely manner. This can occur, for example, during a boot storm. Implementing content-based read cache (CBRC) can alleviate such issues by allowing VMs (e.g., 110-1, 110-2, 110-3) to obtain redundant content from the CBRC cache instead of from the storage subsystem. Retrieval of data from the storage subsystem comes at a greater performance cost and contributes to bottlenecks, since the storage may be a separate device from the host 102-1 and not as easily accessible as host level cache. For example, after one VM obtains content, the content can be cached in the CBRC cache and when another VM subsequently requests the same content it can be obtained from the cache instead of from the storage. However, as described above, implementation of CBRC requires generating a digest file, which is a cryptographical representation of the virtual disk and stores metadata about the various blocks on the virtual disk. Conventionally, the digest file needs to be created before the VM is launched and the creation of the digest file is a lengthy offline process in current systems, making this technology inefficient and impractical in many applications.

Figure 2:
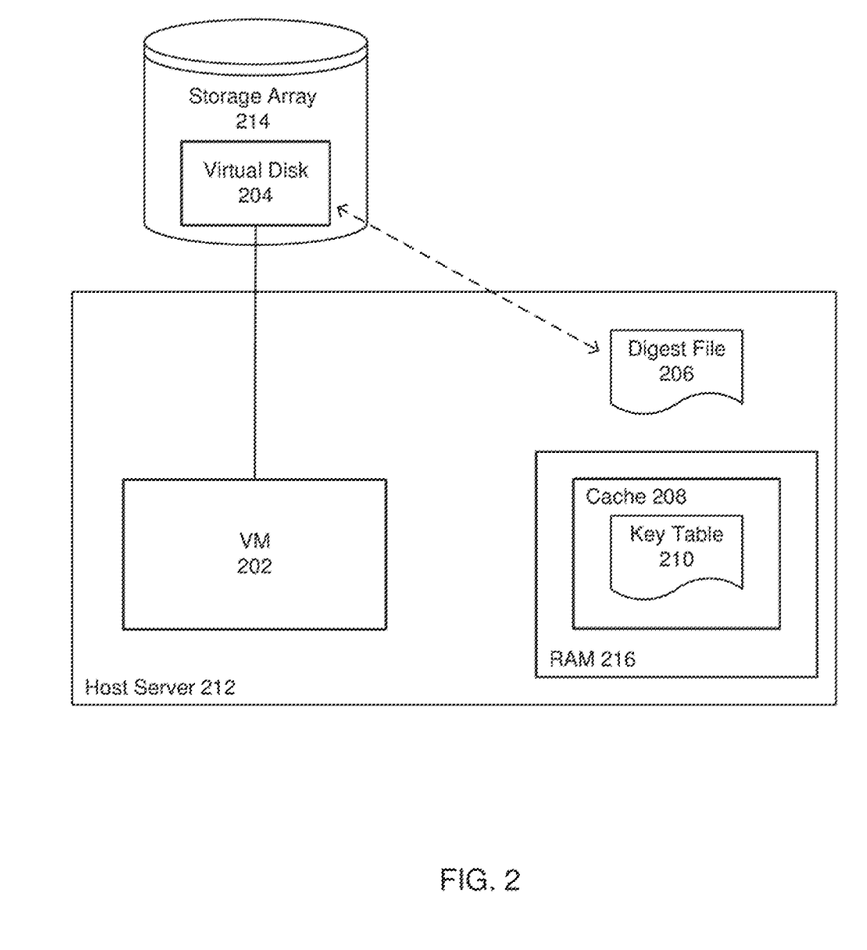
FIG. 2 illustrates an example architecture of a system for reduced downtime virtual machine content-based read caching, in accordance with various embodiments.

FIG. 2 illustrates an example architecture of a system for reduced downtime virtual machine content-based read caching, in accordance with various embodiments. The example of FIG. 2 illustrates a VM 202, which may be hosted on a host server 212 in a datacenter. The VM 202 is coupled to a virtual disk 204 that is stored on a storage array device 214. The storage array device 214 is separate from the host server 212. In various embodiments, the virtual disk 204 can be a software component that emulates an actual disk storage device for the VM 202. For example, the virtual disk 204 can be a file storing the contents of the VM 202 in a format such as VMDK or VHD. The VM 202 further has access to a cache 208, which is a hardware or software component that stores data so that future requests for that data can be served faster. In various embodiments, the cache is a CBRC cache at the host 212 level. The cache 208 may not be specific to any particular VM (e.g., 202) and may be used by different VMs hosted on the server 212. The cache 208 can be located on rapidly accessible storage media such as RAM 216 on the server 212, separate from the storage array 214 and the virtual disk 204. The cache 208 can store frequently accessed or recently accessed data in order to improve performance of the VM 202 by allowing faster access to this data in the cache 208 than on the virtual disk 204. The VM 202 further has access to a digest file 206 stored on the host server 212 corresponding to the virtual disk 204, which can be used by the VM 202 to determine if content of the virtual disk 204 is available in the cache 208, as will be described in more detail below. In an embodiment, the digest file 206 can be stored in the cache 208.

The digest file 206 is a representation of the virtual disk 204 that contains a unique "key" or signature for blocks of the virtual disk 206. For example, the virtual disk can be divided into atomic blocks of 4096 bytes, or "4K" blocks and a key can be computed for each such block and stored in a corresponding place of the digest file. The key can be computed using a cryptographic hashing algorithm such as the SHA-1 algorithm. It will of course be evident to one of ordinary skill in the art that the size of 4096 bytes or the selection of the SHA-1 algorithm are not limitations to the invention and that any other size or cryptographic hashing algorithm can be selected to implement the embodiments described herein. The virtual disk 204 file can further be partitioned into a number of sequential ranges, such that each sequential range is a sequence of multiple blocks. The division of the virtual disk into sequential ranges addresses spatial locality considerations for the caching system. A data structure such as a bitmap can be used to keep track of which ranges of the virtual disk have been completed in the digest file; that is, for which ranges keys for contained blocks have been calculated and stored in the digest file. In a bitmap data structure, a corresponding bit can be assigned to represent each range of the virtual disk. Once a range has been computed and the corresponding keys stored in the digest file, the bit corresponding to that range in the bitmap can be set (e.g., set to "1") to track that this range of the virtual disk has been completed in the digest file.

Figure 3:
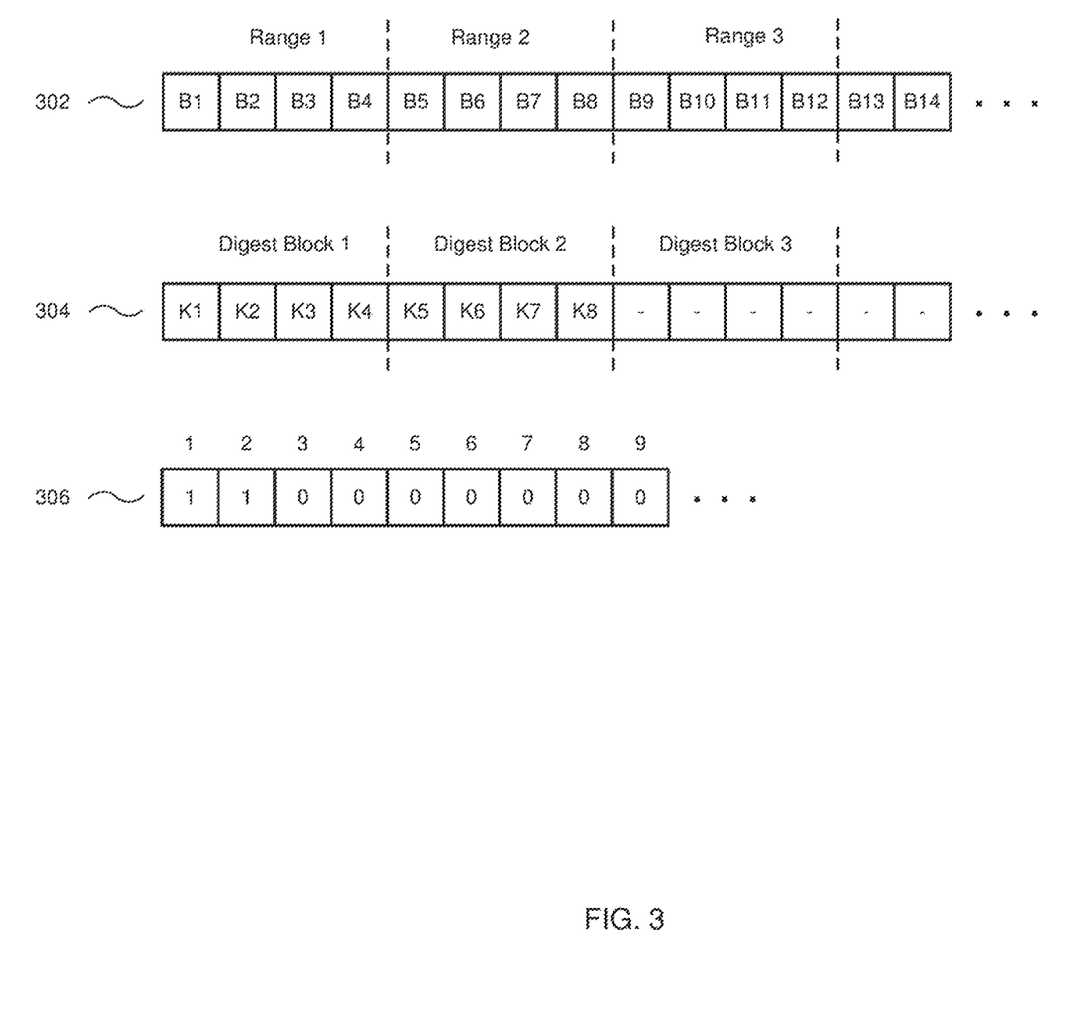
FIG. 3 illustrates an example of a virtual disk with a corresponding digest file and data structure for tracking completion of the digest file, in accordance with various embodiments.

FIG. 3 illustrates an example of a virtual disk with a corresponding digest file and data structure for tracking completion of the digest file, in accordance with various embodiments. In the example of FIG. 3, a virtual disk 302 is divided sequentially into blocks. Each block in the virtual disk 302 can be a 4K block, although in other embodiments the blocks may be of different size. In this example, the illustrated portion of the virtual disk 302 comprises blocks B1 through B14, although the virtual disk may contain further blocks that are not illustrated. The illustrated portion of the virtual disk 302 is further partitioned into sequential ranges 1 through 3. In this example, each range contains four sequential blocks (e.g., range 1 contains blocks B1 through B4, range 2 contains blocks B5 through B8, etc.). In various embodiments, the size of the range can be variable and may depend on the size of the virtual disk file 302. As will be appreciated by those skilled in the art, while only four blocks per range are illustrated in this example, in a real-world implementation each range may contain tens or hundreds of blocks, and the virtual disk 302 would contain many more ranges and blocks than illustrated.

A digest file 304 corresponding to the virtual disk 302 is illustrated below the virtual disk 302. The digest file 304 contains keys corresponding to blocks of the virtual disk 302. For example, key K1 is the key for block B1, which can be produced, for example, by hashing block B1. Key K2 is the key for block B2, and so forth. The digest file 304 is further partitioned into digest blocks. Each digest block corresponds to a range (e.g., digest block 1 corresponds to range 1, digest block 2 corresponds to range 2, etc.) and represents the keys to the blocks within the corresponding range. For example, once the keys of blocks in range 1 (i.e., keys K1 through K4) are calculated and stored in the digest file, digest block 1 is complete.

The example further illustrates a data structure 306 for keeping track of digest file completion. In this case, the data structure 306 is a bitmap that contains a corresponding bit for each range of the virtual disk 302. In other embodiments, different data structures can be used to perform analogous functions. Once a digest block for a range is complete (i.e., keys in the range have been calculated), a corresponding bit in the bitmap is set (e.g., set to "1"). In this example, 9 bits of the bitmap are illustrated (although the bitmap contains further bits that are not illustrated). Each bit in the bitmap 306 corresponds to a range of the virtual disk 302. For example, the bit in position 1 corresponds to the first range, the bit in position 2 corresponds to the second range, and so on. As illustrated, the bit in position 1 has been set to a value of "1" to indicate that range 1 of the virtual disk 302 has been completed in the digest file 304. That is, digest block 1 has been completed since the keys K1 through K4 have been calculated and stored in the digest file 304. Similarly, the bit in position 2 has been set to a value of "1", since digest block 2 has been completed in the digest file 304. Digest block 3, however, does not contain any keys, hence the corresponding bit in position 3 is not set and remains at "0", as do bits 4 through 9.

Thus, at the outset of the process, the digest file 304 would not contain any keys. Once the VM begins executing, the process begins to calculate the keys for each range of the virtual disk 302, one range at a time, to build the digest file 304. In the example of FIG. 3, range 1 and range 2 have been processed, hence the digest file 304 contains the keys K1 through K8, while the remainder of the digest file 304 has not been calculated and hence does not contain any keys.

As described above, in past technologies, the digest file 304 is created before the virtual machine is launched. However, due to the length of time that is often required for producing the digest file 304, this downtime poses significant problems in many applications. The present invention eliminates this problem by providing a system where the VM can be launched before any part of the digest file 304 is produced.

Returning to the example of FIG. 2, the VM 202 can be launched before any part of the digest file 206 is produced. That is, before any keys for the virtual disk 204 blocks have been generated and stored in the digest file 206. In various embodiments, once the VM 202 begins executing, two threads are initialized, a low priority thread for carrying out a background process for producing the digest file 204, and a high priority thread for handling I/O requests (or reads and writes) to the virtual disk 204 and calculating digest blocks for ranges on which the I/O requests lie. Also, a high priority FIFO ("first-in, first-out") link list (or queue) is created and initialized to "NULL" for holding I/O requests, and a bitmap to represent all the sequential ranges in the virtual disk 204 file is initialized.

Once the VM is started, the low priority thread can begin creating the digest block for each sequential range of the virtual disk 204 in linear order, starting from sequential range number 1. Once the digest block for the sequential range is created, the bit for that sequential range is set in the bitmap and the thread moves on to the next sequential range for processing, e.g., sequential range 2. In other embodiments, the processing of sequential ranges does not need to start at the first sequential range and progress linearly but can follow different patterns. The order in which the sequential ranges for the virtual disk file 204 are processed can be scattered or sequential depending on the pattern of incoming I/Os. The processing within each range can be sequential, i.e., processing the blocks (i.e., generating keys for the blocks) starting from the first block in the range and moving to the last. In various embodiments, the low priority thread can check the bitmap to determine which digest blocks have been completed and process the incomplete blocks. For example, after completing a digest block, the low priority thread can check the bitmap to determine the next incomplete block to process (e.g., the thread can scan the bitmap for bits that have not been set and process the corresponding range of the first unset bit that it finds). The low priority thread can process each sequential range in this way, block by block, one range at a time, until the entire digest file 206 is created.

When a read or write request to the virtual disk 204 is received, the system checks if the ranges of the virtual disk 204 where the request lies are already completed in the digest file 206 (e.g., by checking the bitmap to determine if the digest blocks where the request lies are available in the digest file 206). If the corresponding digest blocks are available in the digest file 206, then the system can proceed according to the regular CBRC framework. For example, if the request is a read request, the system retrieves keys for the requested blocks from the digest file 206 and checks whether the cache 208 contains the requested blocks by calculating keys for blocks contained in the cache 208 (using the same algorithm as used for calculating the keys in the digest file 206) and checking if there is a match between the keys retrieved from the digest file 206 and the calculated keys of the blocks in the cache 208. In various embodiments, a key table 210 is maintained in the cache that stores the keys to blocks available in the cache 208. The keys retrieved from the digest file 206 can then be compared against the key table 210 to determine if the cache 208 contains any of the requested blocks. If a matching key is located in the key table 210, then the block corresponding to the matching key is retrieved from the cache 208 and conveyed in response to the read request. If a matching key is not located in the cache key table 210, then the corresponding block is deemed unavailable in the cache 208 and is hence then retrieved from the virtual disk 204 and conveyed in response to the read request.

In various embodiments, when a write request is received for blocks that are already completed in the digest file 206, the data can be written to the virtual disk 204 (the blocks in the incoming write memory buffer can be sent to the existing write data path to service the write request) and, because the corresponding existing keys in the digest file 206 no longer represent the newly written blocks, the digest file 206 can be marked to indicate that those keys and/or those ranges are invalid or incomplete. In various embodiments, when a write requests is received that falls on completed digest blocks, new keys can be calculated for the blocks for which the write is received in the write memory buffer. The blocks in the incoming write memory buffer can be sent to the existing write data path to service the write request. Once a notification from the data path about a successful write is received, the system can update the digest file 206 with the new keys of the corresponding written blocks.

If, however, an I/O (read or write) request to the virtual disk 204 is received and the system determines that ranges of the virtual disk 204 where the request lies are not completed in the digest file 206 (e.g., by checking the bitmap), the request can be partitioned in terms of sequential range boundaries and placed in the FIFO link list or queue from the tail side. Any such new requests can likewise be added at the tail side of the queue.

When it is working, the low priority thread checks the high priority FIFO link list, if there is no request in the high priority FIFO link list then the low priority thread processes the sequential ranges that have not been completed in the digest file 206 one by one, as described above. If the low priority thread checks the high priority FIFO link list and determines/sees that there is a request in the high priority FIFO link list, then the low priority thread signals (e.g., sends a signal notification) to the high priority thread to process the high priority I/Os in the queue. The low priority thread then pauses or goes to sleep until it receives a signal from the high priority thread to resume.

The high priority thread services the requests in the queue from the head of the queue. As will be described in more detail below, the high priority thread retrieves each element (i.e., each read or write request) one by one from the queue, services or performs the request, and completes the digest file for the ranges on which the request lies. Once the high priority thread determines that the queue is empty, i.e., that no more I/O requests are present in the queue, it signals the low priority thread to resume its activity of building the digest file 206 and goes to sleep until a signal is received again from the low priority thread to wake up and process more I/Os. This process is continued until the entire digest file 206 is created. Once the entire digest file 206 is created, the threads can be destroyed, and the link list (the queue) and the bitmap memory can be freed.

When the high priority thread retrieves a read request from the queue, it can first service the read by obtaining the requested blocks (e.g., reading the blocks from the virtual disk 204). Subsequently, the thread can calculate digest blocks for any ranges of the virtual disk 204 that are touched by the read, in order to update the digest file 206. In this case, after servicing the read, the high priority thread first determines the sequential ranges on which any part of the read request lies. Once it determines the sequential ranges on which the request is spread, it creates a digest block for each of the sequential ranges, updates the digest file, and sets the bit for the corresponding sequential range in the bitmap. Even if the read request is partial on a sequential range (i.e., only a part of the sequential range is read), the entire sequential range is processed to produce a corresponding digest block for the range.

When the high priority thread retrieves a write request from the queue, it can first determine the sequential ranges on which the request lies. If the entire request is aligned with the sequential ranges of the digest file 206 (i.e., the request covers entire sequential ranges and not a portion of any range), then a digest block is calculated for each sequential range from the incoming write memory buffer. That is, the digest block is calculated by calculating keys of the blocks in the incoming write data in the write memory buffer in order to produce digest blocks for the digest file 206 after the data is written to the virtual disk 204. Subsequently, the data in the incoming write memory buffer is sent to the existing write data path to service or perform the write request. Once a notification from the data path about a successful write is received, the system can update the digest blocks in the digest file 206 with the calculated keys for each corresponding written-to range and set the corresponding bit in the bitmap.

If the high priority thread retrieves a write request from the queue and determines that the request is not aligned with the sequential ranges of the digest file 206 (i.e., the request covers a part of a range but not the entire range), a different process can be implemented than described above where the request is aligned. In this case, the digest block for the entire range can be calculated, even though the write only modifies a part of the range, in order to complete the digest block. Keys for the blocks for which the write is received in the range can be calculated first from the in-memory data buffer and updated in the digest block. Once the keys for these write blocks are calculated, the blocks can be sent to the generic write data path. Afterwards, keys for all the remaining blocks in the range can be calculated and updated in the digest block, thereby completing the calculation of the digest block. Once the write completion signal is received from the generic write data path, indicating that the write is successful, the digest file 206 can be updated with the completed digest block and the corresponding bit can be set in the bitmap.

In such cases of unaligned write requests as described above, a sequence bitmap representing the blocks in a range can be used to track the completion of keys in a digest block. When an unaligned write request is detected on a range, the high priority thread can initialize such a sequence bitmap for the total number of blocks in the range, such that every bit in this sequence bitmap represents a block in the range. When a key for a block is calculated for the digest block, the bit corresponding to the block can be set in the sequence bitmap to mark that the key for the block is complete. The thread can calculate the keys for every block in the entire sequential range, but the keys for the blocks for which the write was received can be calculated first from the in-memory data buffer and the corresponding bit in the sequence bitmap can be set to indicate that keys for those blocks have been calculated. Then, the blocks for which write was received can be sent to the generic write data path. Once this is done, the remaining blocks in the range can be identified (e.g., based on the sequence bitmap) and keys for all the remaining blocks in the range can be calculated and updated in the digest block. Once a write completion signal is received from the generic write data path for the blocks for which the write was received, the digest file 206 can be updated with the produced digest block and the corresponding bit can be set in the bitmap.

Figure 4:
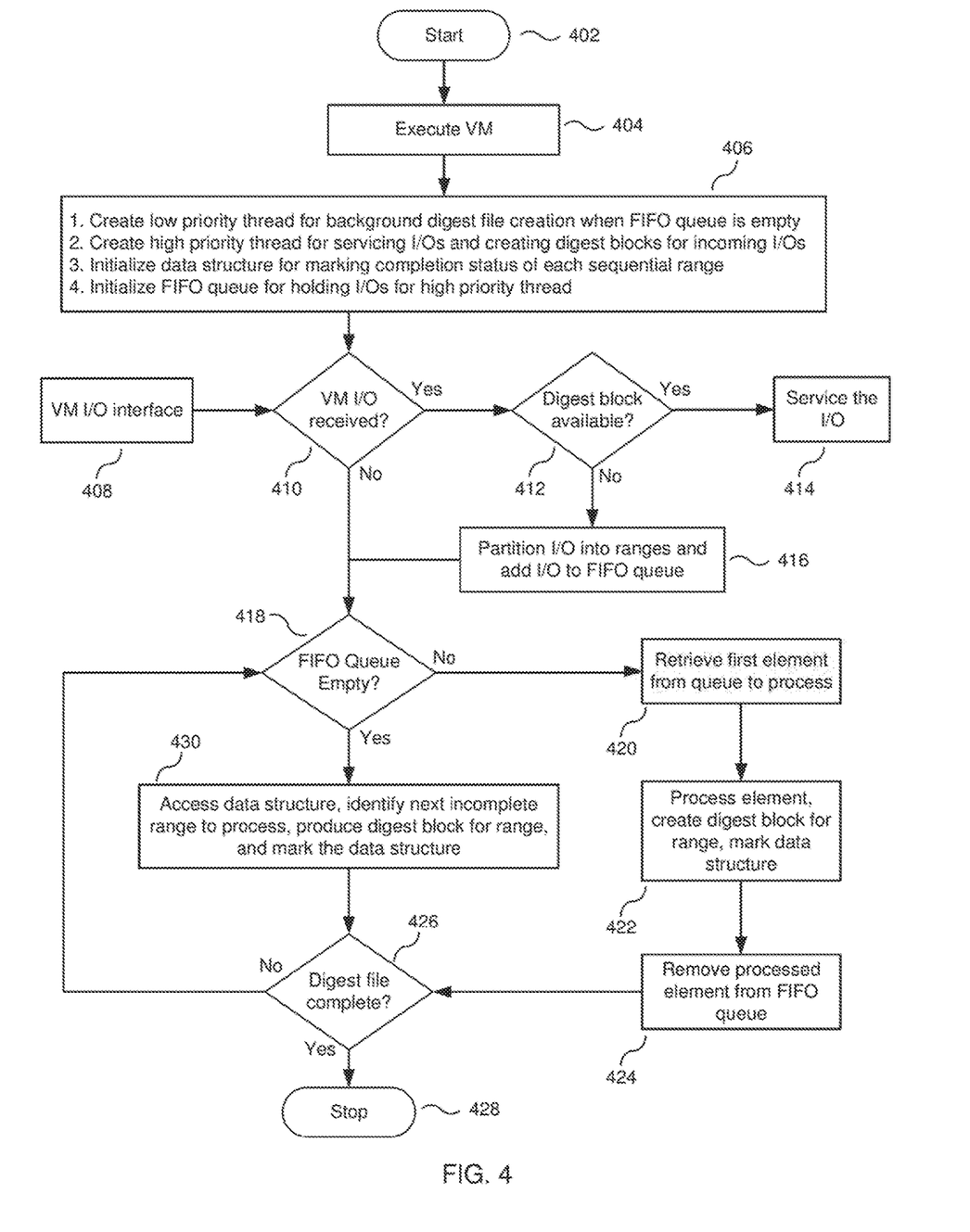
FIG. 4 illustrates an example process flow for a system for reduced downtime virtual machine content-based read caching, in accordance with various embodiments.

FIG. 4 illustrates an example process flow for a system for reduced downtime virtual machine content-based read caching, in accordance with various embodiments. The process starts in block 402. In operation 404, the VM is executed and begins running. Four steps take place in operation 406. In step 1 of operation 406, a low priority thread is created for background digest file creation when the FIFO queue is empty. In step 2 of operation 406, a high priority thread is created for servicing I/Os and creating digest blocks for incoming I/Os. In step 3 of operation 406, a data structure is initialized for marking completion status of each sequential range. The data structure may be a bitmap with each bit representing a digest block in the digest file. In step 4 of operation 406, a FIFO queue is initialized for holding I/Os for the high priority thread. In operation 408, the VM I/O interface receives I/O requests. In operation 410, the process determines whether an I/O was received at the VM.

If decision 410 determines that no I/O was received, then the process moves on to decision 418, where it checks if the FIFO queue is empty. If decision 410 determines that a VM I/O is received, then the process moves to step 412. In step 412, the process determines whether digest blocks are available in the digest file for the received I/O. For example, if the I/O is a read, then the process determines if the digest file contains digest blocks for the ranges covered by the read. If the I/O is a write, then the process determines if the digest file contains digest blocks for the ranges covered by the write. If the process determines that the digest blocks are available in decision 412, then the process moves to step 416, where the I/O is serviced. For example, if the I/O is a read, then the requested blocks can be retrieved for the read (e.g., from the virtual disk). If the I/O is a write, then the write can be processed by writing to the virtual disk and marking the corresponding portions (keys and/or ranges) of the virtual disk as invalid or incomplete. Or, keys for the written blocks can be calculated and updated in the digest file. If, in decision 412, the process determines that the digest blocks are not available for the I/O, then in step 416 the I/O is partitioned into ranges and the I/O is added to the FIFO queue from the tail side. The process then moves to decision 418, where it checks whether the FIFO queue is empty.

If, in decision 418, the process determines that the FIFO queue is not empty, then the process moves to step 420, where it (via the high priority thread) retrieves the first element from the head of the queue for processing. In operation 422, which is performed by the high priority thread, the retrieved element is processed (i.e., the read or write operation is performed), the digest blocks for the ranges on which the read/write lies are calculated and updated in the digest file, and the data structure is marked to indicate completion of the corresponding digest blocks (e.g., corresponding bits are set in the bitmap). In operation 424, the processed element is removed from the FIFO queue. The process then proceeds to decision 426, where it determines whether the digest file is complete. If the process determines that the digest file is complete, the process is stopped in operation 428. If the digest file is not complete, then the process moves back to decision 418 to check if the queue is empty. If the queue is empty in decision 418, then the process moves to step 430, which is performed by the low priority thread, where it accesses the data structure to identify the next incomplete range (e.g., locates the next unset bit in the bitmap), processes the identified range (by calculating keys for all blocks in the range) to produce the digest block for the range in the digest file, and marks the data structure to indicate that the digest block is complete (e.g., by setting the corresponding bit in the bitmap). The process then moves to decision 426, where it determines whether the digest file is complete. If the process determines that the digest file is complete, the process is stopped in operation 428.

Figure 5:
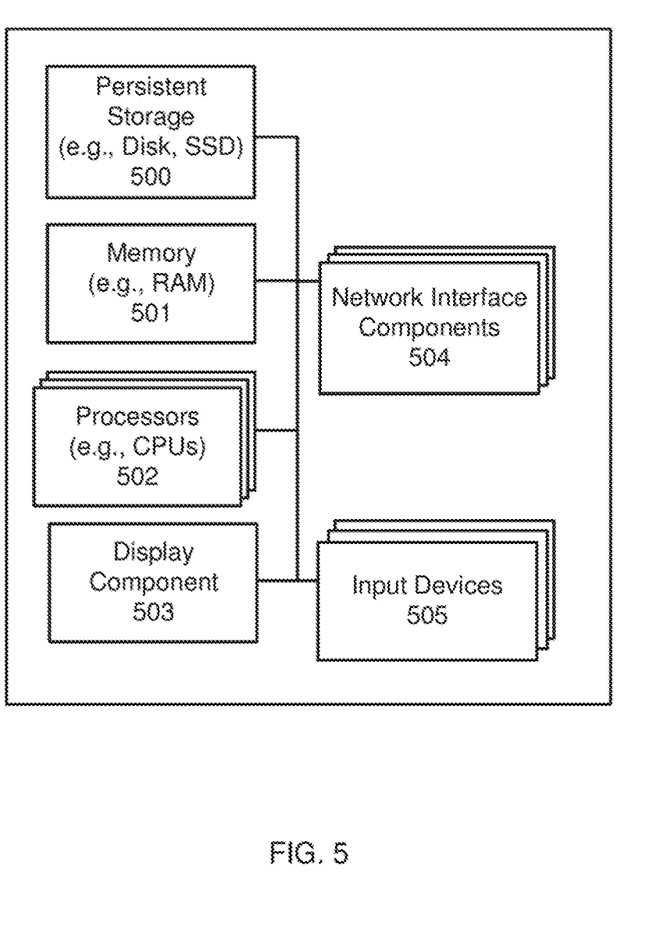
FIG. 5 illustrates an example of some general components of a computing device, in accordance with various embodiments.

FIG. 5 illustrates an example of some general components of a computing device, in accordance with various embodiments. In this particular example, the device includes one or more processors (e.g., central processing units (CPUs) 502 for executing instructions that can be stored in a storage medium component. The storage medium can include many types of memory, persistent data storage, or non-transitory computer-readable storage media. For example, the storage medium may take the form of random access memory (RAM) 501 storing program instructions for execution by the processor(s) 502, a persistent storage (e.g., disk or SSD) 500, a removable memory for sharing information with other devices and/or the like. The computing device typically can further comprise a display component 503, such as a monitor, a touch screen, liquid crystal display (LCD), or the like. In various embodiments, the computing device will include at least one input device 505 able to receive conventional input from a user. This conventional input can include, for example, a push button, touch pad, touch screen, wheel, joystick, keyboard, mouse, keypad, or any other such device or element whereby a user can input a command to the device. In some embodiments, the computing device can include a network interface component (NIC) 504 for communicating over various networks, such as a Wi-Fi, Bluetooth, RF, wired, or wireless communication systems. The device in many embodiments can communicate over a network, such as the Internet, and may be able to communicate with other devices connected to the same or other network.

Various embodiments described herein can be implemented in a wide variety of environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Many embodiments utilize at least one network that would be familiar to those skilled in the art for supporting communications using any of a variety of commercially-available protocols, such as TCP/IP, FTP, UDP or the like. The network can be, for example, a local area network, a wide-area network, a virtual private network, the Internet, an intranet, an extranet, a public switched telephone network, an infrared network, a wireless network, and any combination thereof.

The various environments in which the embodiments can be implemented may include a variety of data stores and other memory and storage media, as discussed above. These can reside in a variety of locations, such as on a storage medium local to one or more of the computers or remote from any or all of the computers across the network. In some embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method for caching data in a virtual machine (VM), comprising:
    executing the virtual machine;
    after the virtual machine is executed, initiating a background process for creating a digest file corresponding to a virtual disk of the virtual machine, the background process comprising:
        partitioning the virtual disk into a plurality of blocks;
        generating a key for each block and storing the key in the digest file;
    receiving a request to read a first block from the virtual disk;
    in response to the request to read the first block:
        locating a key corresponding to the first block in the digest file;
        locating the first block in a cache of the VM by comparing the key corresponding to the first block in the digest file with keys of blocks located in the cache;
        retrieving the first block from the cache to service the read request;
    receiving a request to write a second block to the virtual disk;
    in response to the request to write the second block to the virtual disk, pausing the background process for creating the digest file and, while the background process for creating the digest file is paused, writing the second block to the virtual disk to service the request;
    calculating a key for the second block; and
    storing the calculated key for the second block in the digest file.

2. The method of claim 1, further comprising:
    receiving a request to read a third block from the virtual disk;
    determining that a key corresponding to the third block is not available in the digest file;
    pausing the background process for creating the digest file;
    retrieving the third block from the virtual disk to service the read request;
    calculating a key for the third block;
    storing the calculated key for the third block in the digest file; and resuming the background process for creating the digest file.

3. The method of claim 1, further comprising:
determining that no read or write requests are pending; and
in response to determining that no read or write requests are pending, resuming the background process for creating the digest file.

4. The method of claim 1, further comprising:
partitioning the virtual disk into a plurality of sequential ranges, each sequential range comprising a sequence of multiple blocks of the virtual disk;
by the background process for creating the digest file:
processing the sequential ranges of the virtual disk by generating a key for each block in a sequential range and storing the key in the digest file;
after a key for each block in the sequential range is produced and stored in the digest file, setting a corresponding value in a data structure for tracking the creation of the digest file to indicate that the sequential range is completed in the digest file, the data structure containing a corresponding value for each sequential range of the virtual disk to indicate whether the corresponding sequential range has been completed in the digest file; and
wherein the background process for creating the digest file checks the data structure to determine which sequential ranges of the virtual disk to process to produce the digest file.

5. The method of claim 4, further comprising:
receiving a request to read a third block from the virtual disk;
determining that a key corresponding to the third block is not available in the digest file;
pausing the background process for creating the digest file;
retrieving the third block to service the read request;
calculating a key for the third block and for each other block in the sequential range of the virtual disk in which the third bock is located;
storing the calculated keys in the digest file;
setting a corresponding value in the data structure for tracking the creation of the digest file to indicate that the sequential range where the third block is located has been completed in the digest file; and
resuming the background process for creating the digest file.

6. The method of claim 4, further comprising:
receiving a request to write a third block to the virtual disk;
pausing the background process for creating the digest file;
calculating a key for the third block and for each other block in the sequential range of the virtual disk in which the third bock will be located;
storing the calculated keys in the digest file;
writing the third block to the virtual disk to service the request;
setting a corresponding value in the data structure for tracking the creation of the digest file to indicate that the sequential range where the third block is located has been completed in the digest file; and
resuming the background process for creating the digest file.

7. The method of claim 1, further comprising:
by the background process:
checking a queue for storing received read and write requests;
determining that a read or write request is present in the queue;
in response to determining that the read or write request is present in the queue, signaling a high priority thread to process the read or write request in the queue and going to sleep;
receiving a signal to wake up and resume creating the digest file, the signal being sent in response to no more requests being present in the queue.

8. A computing device for caching data in a virtual machine (VM), comprising:
at least one processor; and
memory including instructions that, when executed by the at least one processor, cause the computing device to perform the steps of:
executing the virtual machine;
after the virtual machine is executed, initiating a background process for creating a digest file corresponding to a virtual disk of the virtual machine, the background process comprising:
partitioning the virtual disk into a plurality of blocks;
generating a key for each block and storing the key in the digest file;
receiving a request to read a first block from the virtual disk;
in response to the request to read the first block:
locating a key corresponding to the first block in the digest file;
locating the first block in a cache of the VM by comparing the key corresponding to the first block in the digest file with keys of blocks located in the cache;
retrieving the first block from the cache to service the read request;
receiving a request to write a second block to the virtual disk;
in response to the request to write the second block to the virtual disk, pausing the background process for creating the digest file and, while the background process for creating the digest file is paused, writing the second block to the virtual disk to service the request;
calculating a key for the second block; and
storing the calculated key for the second block in the digest file.

9. The computing device of claim 8, wherein the memory further includes instructions that when executed by the at least one processor, cause the computing device to perform the steps of:
receiving a request to read a third block from the virtual disk;
determining that a key corresponding to the third block is not available in the digest file;
pausing the background process for creating the digest file;
retrieving the third block from the virtual disk to service the read request;
calculating a key for the third block;
storing the calculated key for the third block in the digest file; and
resuming the background process for creating the digest file.

10. The computing device of claim 8, wherein the memory further includes instructions that when executed by the at least one processor, cause the computing device to perform the steps of:

determining that no read or write requests are pending; and     in response to determining that no read or write requests are pending, resuming the background process for creating the digest file.

11. The computing device of claim 8, wherein the memory further includes instructions that when executed by the at least one processor, cause the computing device to perform the steps of:

partitioning the virtual disk into a plurality of sequential ranges, each sequential range comprising a sequence of multiple blocks of the virtual disk;

by the background process for creating the digest file:

processing the sequential ranges of the virtual disk by generating a key for each block in a sequential range and storing the key in the digest file;

after a key for each block in the sequential range is produced and stored in the digest file, setting a corresponding value in a data structure for tracking the creation of the digest file to indicate that the sequential range is completed in the digest file, the data structure containing a corresponding value for each sequential range of the virtual disk to indicate whether the corresponding sequential range has been completed in the digest file; and     wherein the background process for creating the digest file checks the data structure to determine which sequential ranges of the virtual disk to process to produce the digest file.

12. The computing device of claim 11, wherein the memory further includes instructions that when executed by the at least one processor, cause the computing device to perform the steps of:

receiving a request to read a third block from the virtual disk;

determining that a key corresponding to the third block is not available in the digest file;

pausing the background process for creating the digest file;

retrieving the third block to service the read request;

calculating a key for the third block and for each other block in the sequential range of the virtual disk in which the third bock is located;

storing the calculated keys in the digest file;

setting a corresponding value in the data structure for tracking the creation of the digest file to indicate that the sequential range where the third block is located has been completed in the digest file; and     resuming the background process for creating the digest file.

13. The computing device of claim 11, wherein the memory further includes instructions that when executed by the at least one processor, cause the computing device to perform the steps of:

receiving a request to write a third block to the virtual disk;

pausing the background process for creating the digest file;

calculating a key for the third block and for each other block in the sequential range of the virtual disk in which the third block will be located;

storing the calculated keys in the digest file;

writing the third block to the virtual disk to service the request;

setting a corresponding value in the data structure for tracking the creation of the digest file to indicate that the sequential range where the third block is located has been completed in the digest file; and     resuming the background process for creating the digest file.

14. The computing device of claim 8, wherein the memory further includes instructions that when executed by the at least one processor, cause the computing device to perform the steps of:

by the background process:

checking a queue for storing received read and write requests;

determining that a read or write request is present in the queue;

in response to determining that the read or write request is present in the queue, signaling a high priority thread to process the read or write request in the queue and going to sleep;

receiving a signal to wake up and resume creating the digest file, the signal being sent in response to no more requests being present in the queue.

15. A non-transitory computer readable storage medium for caching data in a virtual machine (VM), comprising one or more sequences of instructions, the instructions when executed by one or more processors causing the one or more processors to execute the operations of:

executing the virtual machine;

after the virtual machine is executed, initiating a background process for creating a digest file corresponding to a virtual disk of the virtual machine, the background process comprising:

partitioning the virtual disk into a plurality of blocks;

generating a key for each block and storing the key in the digest file;

receiving a request to read a first block from the virtual disk;

in response to the request to read the first block:

locating a key corresponding to the first block in the digest file;

locating the first block in a cache of the VM by comparing the key corresponding to the first block in the digest file with keys of blocks located in the cache;

retrieving the first block from the cache to service the read request;

receiving a request to write a second block to the virtual disk;

in response to the request to write the second block to the virtual disk, pausing the background process for creating the digest file and, while the background process for creating the digest file is paused, writing the second block to the virtual disk to service the request;

calculating a key for the second block; and storing the calculated key for the second block in the digest file.

16. The non-transitory computer readable storage medium of claim 15, further comprising instructions that when executed by the one or more processors cause the one or more processors to execute the operations of:

receiving a request to read a third block from the virtual disk;

determining that a key corresponding to the third block is not available in the digest file;

pausing the background process for creating the digest file;
retrieving the third block from the virtual disk to service the read request;
calculating a key for the third block;
storing the calculated key for the third block in the digest file; and
resuming the background process for creating the digest file.

17. The non-transitory computer readable storage medium of claim 15, further comprising instructions that when executed by the one or more processors cause the one or more processors to execute the operations of:
determining that no read or write requests are pending; and
in response to determining that no read or write requests are pending, resuming the background process for creating the digest file.

18. The non-transitory computer readable storage medium of claim 15, further comprising instructions that when executed by the one or more processors cause the one or more processors to execute the operations of:
partitioning the virtual disk into a plurality of sequential ranges, each sequential range comprising a sequence of multiple blocks of the virtual disk;
by the background process for creating the digest file:
processing the sequential ranges of the virtual disk by generating a key for each block in a sequential range and storing the key in the digest file;
after a key for each block in the sequential range is produced and stored in the digest file, setting a corresponding value in a data structure for tracking the creation of the digest file to indicate that the sequential range is completed in the digest file, the data structure containing a corresponding value for each sequential range of the virtual disk to indicate whether the corresponding sequential range has been completed in the digest file; and
wherein the background process for creating the digest file checks the data structure to determine which sequential ranges of the virtual disk to process to produce the digest file.

19. The non-transitory computer readable storage medium of claim 18, further comprising instructions that when executed by the one or more processors cause the one or more processors to execute the operations of:
receiving a request to read a third block from the virtual disk;
determining that a key corresponding to the third block is not available in the digest file;
pausing the background process for creating the digest file;
retrieving the third block to service the read request;
calculating a key for the third block and for each other block in the sequential range of the virtual disk in which the third bock is located;
storing the calculated keys in the digest file;
setting a corresponding value in the data structure for tracking the creation of the digest file to indicate that the sequential range where the third block is located has been completed in the digest file; and
resuming the background process for creating the digest file.

20. The non-transitory computer readable storage medium of claim 18, further comprising instructions that when executed by the one or more processors cause the one or more processors to execute the operations of:
receiving a request to write a third block to the virtual disk;
pausing the background process for creating the digest file;
calculating a key for the third block and for each other block in the sequential range of the virtual disk in which the third block will be located;
storing the calculated keys in the digest file;
writing the third block to the virtual disk to service the request;
setting a corresponding value in the data structure for tracking the creation of the digest file to indicate that the sequential range where the third block is located has been completed in the digest file; and
resuming the background process for creating the digest file.

* * * * *